United States Patent
Kanda

(10) Patent No.: US 10,650,784 B2
(45) Date of Patent: May 12, 2020

(54) DISPLAY DEVICE, TELEVISION RECEIVER, DISPLAY METHOD, AND RECORDING MEDIUM

(71) Applicant: SHARP KABUSHIKI KAISHA, Sakai, Osaka (JP)

(72) Inventor: Takashi Kanda, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/080,123

(22) PCT Filed: Feb. 15, 2017

(86) PCT No.: PCT/JP2017/005544
§ 371 (c)(1),
(2) Date: Aug. 27, 2018

(87) PCT Pub. No.: WO2017/159191
PCT Pub. Date: Sep. 21, 2017

(65) Prior Publication Data
US 2019/0073982 A1   Mar. 7, 2019

(30) Foreign Application Priority Data
Mar. 16, 2016  (JP) .................. 2016-052759

(51) Int. Cl.
| | | |
|---|---|---|
| *G09G 5/02* | (2006.01) | |
| *H04N 9/73* | (2006.01) | |
| *H04N 9/77* | (2006.01) | |
| *G09G 5/00* | (2006.01) | |
| *G09G 5/10* | (2006.01) | |

(52) U.S. Cl.
CPC ............... *G09G 5/02* (2013.01); *G09G 5/00* (2013.01); *G09G 5/10* (2013.01); *H04N 9/73* (2013.01); *H04N 9/77* (2013.01); *G09G 2320/0666* (2013.01); *G09G 2340/0428* (2013.01)

(58) Field of Classification Search
CPC .... G09G 5/02; G09G 2320/0666; G09G 5/00; G09G 5/10; G09G 2360/16; G09G 2320/0233; H04N 9/77; H04N 9/73; H04N 1/60; G06T 2207/20208; G06T 2207/10024; G06T 7/90
See application file for complete search history.

(56) References Cited

U.S. PATENT DOCUMENTS

2013/0314436 A1* 11/2013 Nakamura ........... G09G 3/3611
                                                        345/601
2016/0344990 A1* 11/2016 Kozuka ............. H04N 21/43635

FOREIGN PATENT DOCUMENTS

| JP | 11-338407 A | 12/1999 |
|---|---|---|
| JP | 2013-126045 A | 6/2013 |
| JP | 2014-109710 A | 6/2014 |

* cited by examiner

*Primary Examiner* — Xilin Guo
(74) *Attorney, Agent, or Firm* — ScienBiziP, P.C.

(57) ABSTRACT

An image of an HDR signal, in which deterioration in luminance due to adjustment of white balance is suppressed while variations of a color of an image of an SDR signal is suppressed, is displayed. A television (1) that displays an image is which white balance is adjusted includes a determination unit (12) that determines whether an image signal is an HDR signal or an SDR signal, and a display control unit (14) that, in a case where the determination unit determines that the image signal is the HDR signal, changes gain of at least one primary color among primary colors to a value higher than a set value.

9 Claims, 7 Drawing Sheets

(a)

(b)

(c)

DISPLAY DEVICE, TELEVISION RECEIVER, DISPLAY METHOD, AND RECORDING MEDIUM

TECHNICAL FIELD

The present invention relates to a display device that displays an image in which white balance is adjusted, a television receiver that includes the display device, a display method by which an image is displayed on the display device, a control program that causes a computer to function as the display device, and a recording medium that stores the control program.

BACKGROUND ART

In general, there is a difference in white balance on images displayed by individual display devices. Therefore, adjustment of white balance is performed in a process of manufacturing display devices. On the other hand, the adjustment of white balance causes deterioration in luminance and therefore a technique of suppressing the deterioration in luminance has been demanded.

For example, PTL 1 describes a white balance adjustment method by which, in order that a display color when displaying a white image is included in a predetermined target range, a determined point of the display color included in the target range is set so that deterioration in luminance becomes smaller.

Moreover, for example, PTL 2 describes a method by which, in a case where screen luminance after adjustment of white balance is less than reference luminance, gradation of at least one color of two colors whose gradation is not fixed is readjusted so as to be high.

CITATION LIST

Patent Literature

PTL 1: Japanese Unexamined Patent Application Publication No. 2013-126045 (published on Jun. 24, 2013)
PTL 2: Japanese Unexamined Patent Application Publication No. 2014-109710 (published on Jun. 12, 2014)

SUMMARY OF INVENTION

Technical Problem

However, in the above-described conventional techniques, there is a problem that, even in a case of acquiring an HDR (High Dynamic Range) signal which is an image signal for displaying an image having an enhanced contrast, an image whose luminance is lower than luminance which is able to be output by a display device is displayed due to adjustment of white balance. Moreover, when a case of displaying an image of an HDR signal is considered and white balance is adjusted so that luminance becomes high, variations of a color become great when displaying an image of an SDR signal.

The invention has been made in view of the aforementioned problems, and an object thereof is to provide a technique of displaying an image of an HDR signal, in which deterioration in luminance due to adjustment of white balance is suppressed while variations of a color of an image of an SDR signal is suppressed.

Solution to Problem

In order to solve the aforementioned problems, a display device according to an aspect of the invention is a display device that displays an image in which white balance is adjusted by setting a gain value of each of primary colors, the display device including: a determination unit that determines whether an image signal that has been input is a first image signal or a second image signal a possible luminance dynamic range of which is wider than that of the first image signal; and a display control unit that, in a case where the determination unit determines that the image signal is the second image signal, changes gain of at least one primary color among the primary colors to a value higher than a set value.

In order to solve the aforementioned problems, a display method according to an aspect of the invention is a display method of displaying an image on a display device that displays an image in which white balance is adjusted by setting a gain value of each of primary colors, the display method including: a determination step of determining whether an image signal that has been input is a first image signal or a second image signal a possible luminance dynamic range of which is wider than that of the first image signal; and a display control step of changing, in a case where the image signal is determined to be the second image signal at the determination step, gain of at least one primary color among the primary colors to a value higher than a set value.

Advantageous Effects of Invention

According to an aspect of the invention, it is possible to display an image in which deterioration in luminance due to adjustment of white balance is suppressed while variations of a color of an image of a first image signal (SDR signal) is suppressed and which is an image of a second image signal (HDR signal) whose possible luminance dynamic range is wider than that of the SDR signal.

DESCRIPTION OF EMBODIMENTS

[Embodiment 1]
Hereinafter, an embodiment of the invention will be described is detail with reference to FIG. 1 to FIG. 5.

(Television receiver 1)

Figure 1:
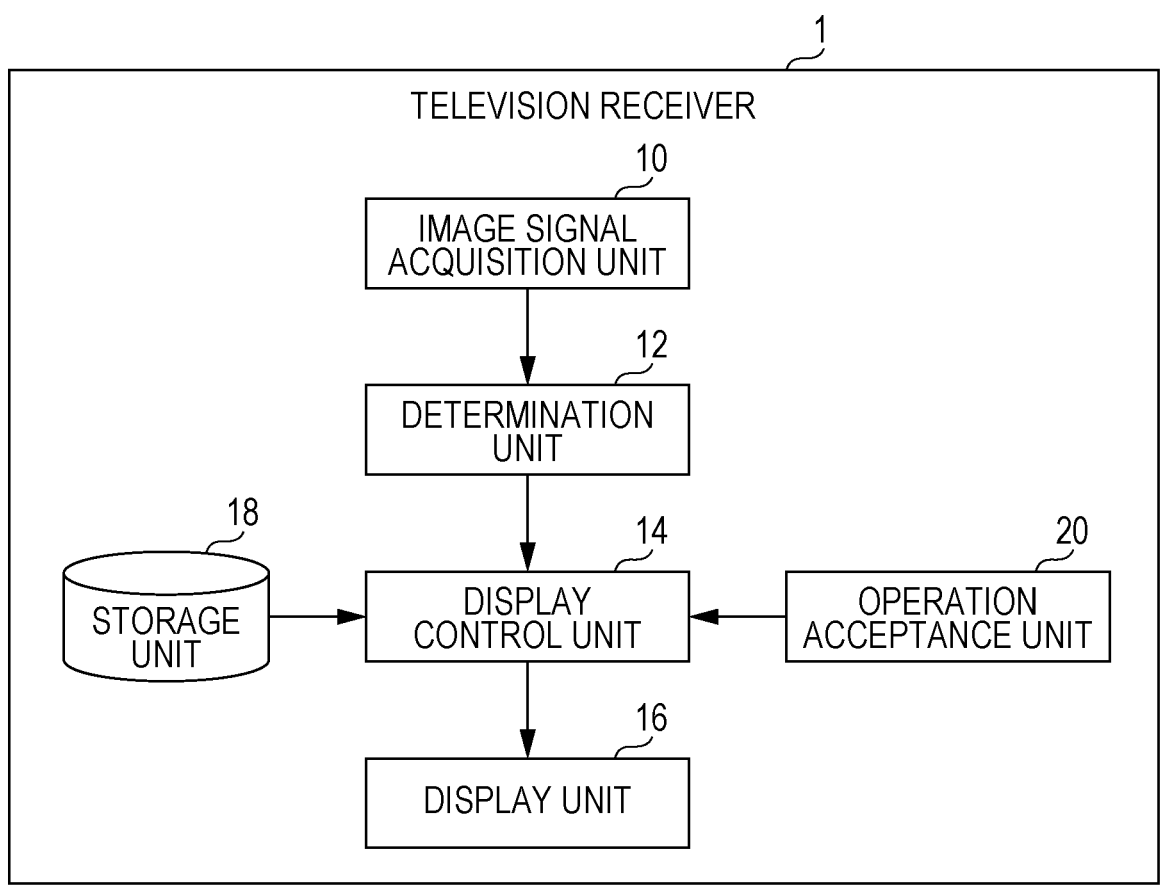
FIG. 1 is a block diagram illustrating a configuration of a main part of a television receiver according to Embodiment 1 of the invention.

FIG. 1 is a block diagram illustrating a configuration of a main part of a television receiver (display device) 1 according to Embodiment 1. The television receiver 1 (hereinafter, simply referred to as a "television 1") is able to acquire, in addition to an SDR (standard dynamic range) signal (first image signal) that is an image signal whose dynamic range is standard, an HDR (High Dynamic Range) signal (second image signal) whose possible luminance dynamic range is wider than that of the SDR signal, and to display an image according to the image signal.

Examples of a standard to which the HDR signal conforms include a video format that is prescribed by SMPTE (Society of Motion Picture and Television Engineers) ST. 2084-2014, CTA (Consumer Technology Association)-861-F, or the like. Moreover, examples of a standard to which the SDR signal conforms include a video format that is prescribed by Rec.

Furthermore, the television 1 has a configuration in which a gain value of at least one of red (R), green (G), and blue (B) that are primary colors of an image to be displayed is changed in accordance with whether an image signal that has been input is an HDR signal or an SDR signal and thereby a luminance priority image or a chromaticity priority image is displayed. Details of the configuration and the luminance priority image and the chromaticity priority image will be described below.

As illustrated in FIG. 1, the television 1 includes an image signal acquisition unit 10, a determination unit 12, a display control unit 14, a display unit 16, a storage unit 18, and an operation acceptance unit 20.

The image signal acquisition unit 10 is an interface for acquiring an image signal. Examples of an image signal acquired by the image signal acquisition unit 10 include a tuner signal that is acquired via a tuner, an HDMI (registered trademark) (High-Definition Multimedia Interface) signal that is acquired via. HDMI, and a CVBS (Composite Video, Blanking, and Sync) signal.

The determination unit 12 determines whether the image signal acquired by the image signal acquisition unit 10 is an HDR signal or an SDR signal.

The display control unit 14 controls the display unit 16, which will be described below, to cause the display unit 16 to display an image. Moreover, the display control unit 14 causes the display unit 16 to display a luminance priority image or a chromaticity priority image in accordance with a result of the determination of the determination unit 12.

The display unit 16 is a display device that displays an image. The display unit 16 is realized by a transmissive liquid crystal panel that includes a backlight, an organic EL (Electro luminescence) display, or the like. White balance of an image displayed by the display unit 16 is able to be adjusted by adjusting a gain value of each of the primary colors.

The storage unit 18 is a device that is able to store data therein. Specifically, a gain value of each of the primary colors, which has been subjected to adjustment of white balance, and the like are stored in the storage unit 18.

The operation acceptance unit 20 accepts an operation by a user and outputs operation information that indicates the operation. The operation acceptance unit 20 is realized by an infrared signal reception unit that receives an infrared signal transmitted from a remote controller, a switch, a touch pad, or the like.

(External Appearance of Television 1)

Figure 2:
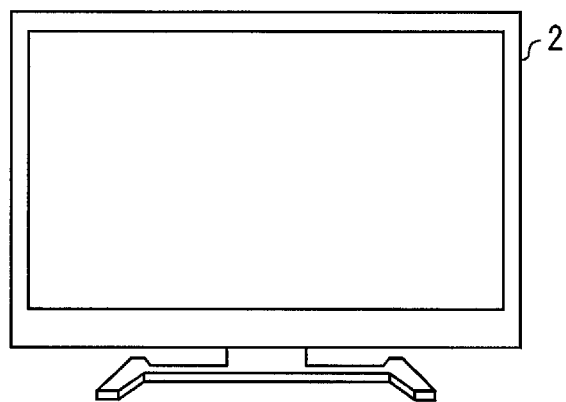
FIG. 2 illustrates external appearance views illustrating a display device, a personal computer, and a portable information terminal device each of which is realized as a part of a television according to Embodiment 1 of the invention.
Figure 2:
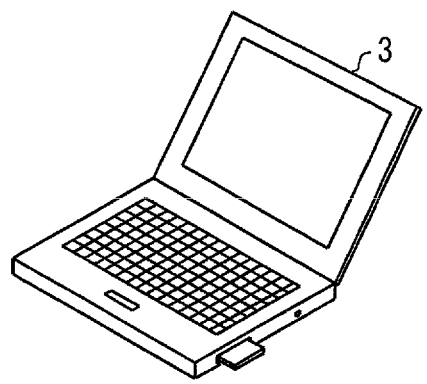
Figure 2:
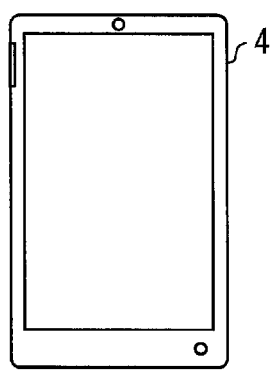

FIG. 2 illustrates external appearance views illustrating a display device 2, a personal computer 3, and a portable information terminal device 4 each of which is realized as a part of the television 1 according to Embodiment 1. As illustrated in FIG. 2, the display device (FIG. 2(a)), the personal computer 3 (FIG. 2(b)), or the portable information terminal device 4 (FIG. 2(c)) is realized as a part of the television 1, but there is no limitation thereto.

(Luminance Priority Image and Chromaticity Priority Image)

Figure 3:
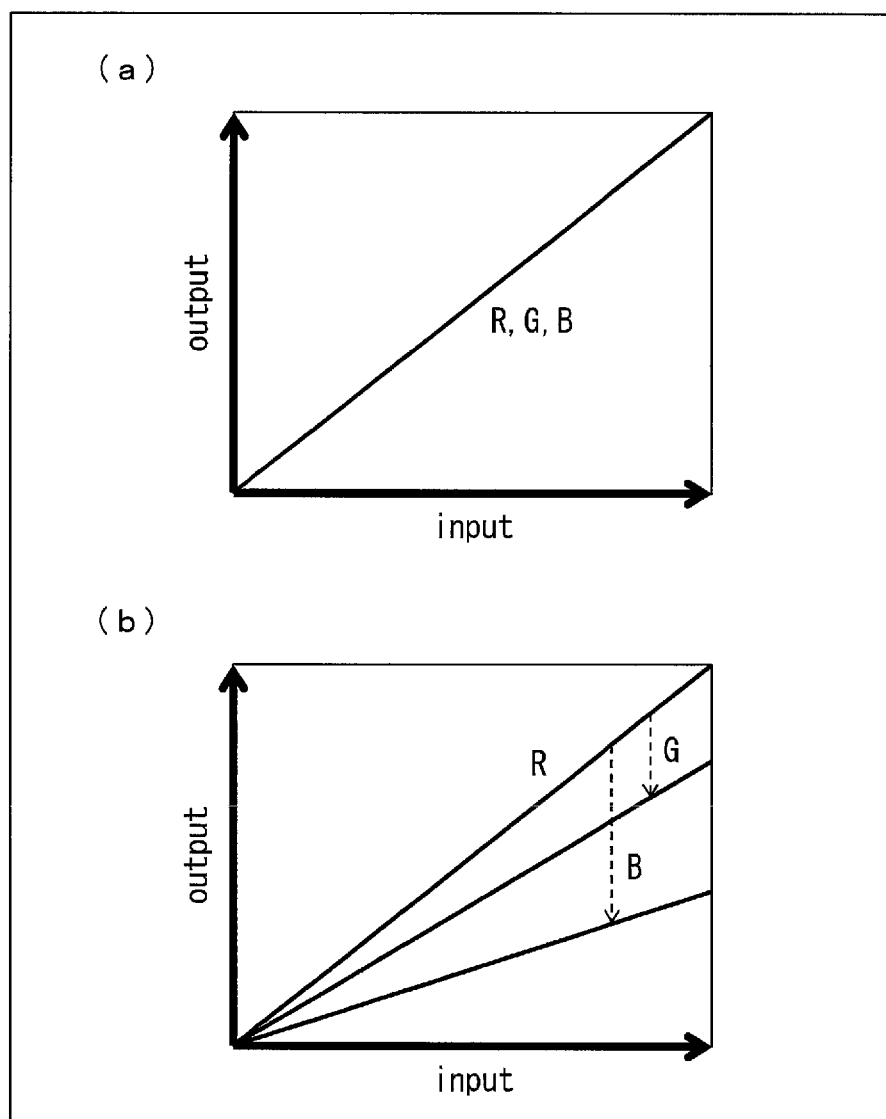
FIG. 3 illustrates graphs each indicating gain of each primary color of an image displayed by the television according to Embodiment 1 of the invention.
Figure 4:
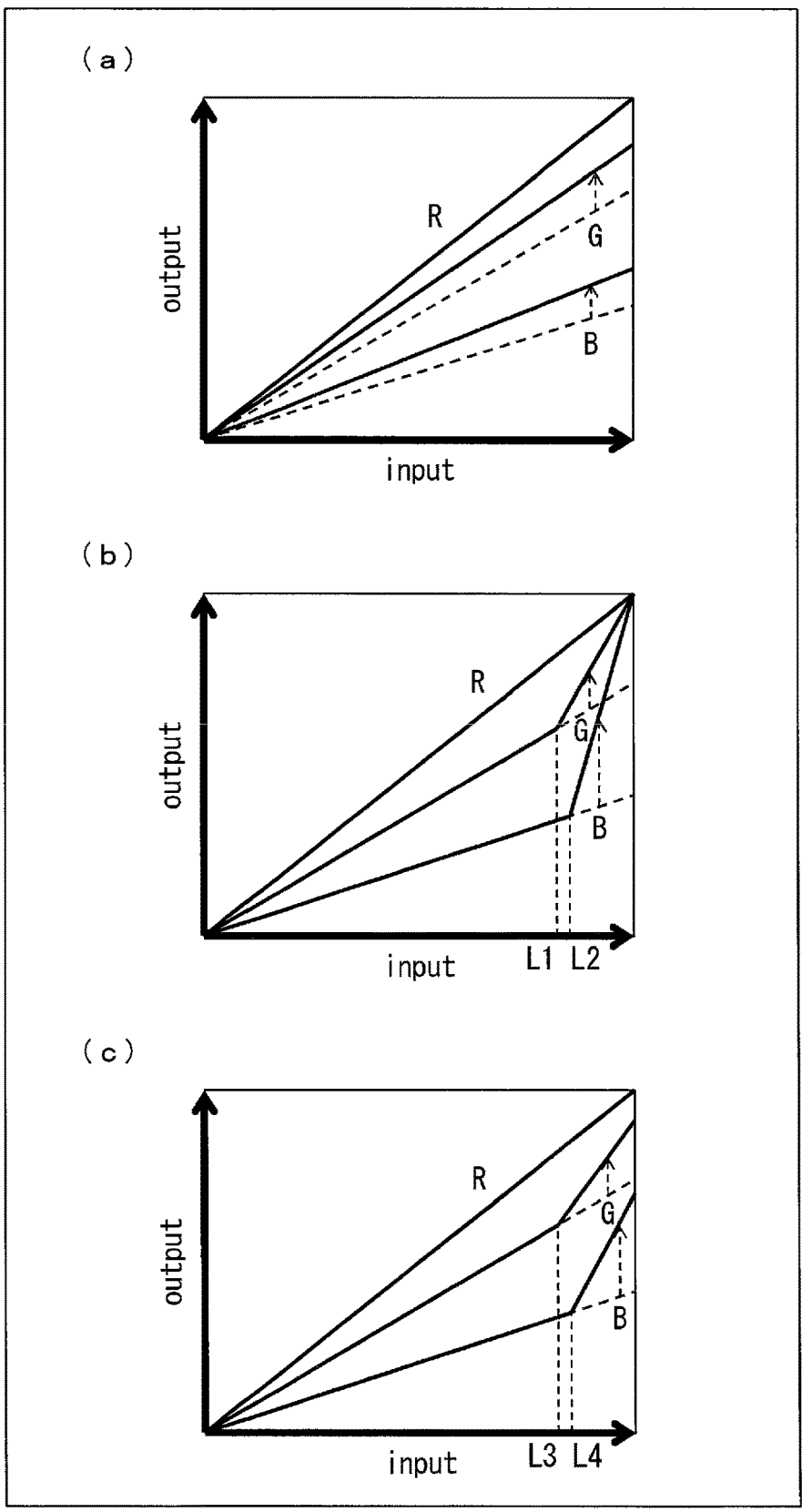
FIG. 4 illustrates graphs each indicating gain of each primary color of a luminance priority image displayed by the television according to Embodiment 1 of the invention.

A luminance priority image and a chromaticity priority image that are displayed by the television 1 will be described with reference to FIG. 3 and FIG. 4. FIG. 3 illustrates graphs each indicating gain of each primary color of an image displayed by the television 1 according to Embodiment 1. FIG. 3(a) is a graph indicating gain of each primary color before adjustment of white balance, and FIG. 3(b) is a graph indicating gain of each primary color after adjustment of white balance. FIG. 4 illustrates graphs each indicating gain of each primary color of a luminance priority image displayed by the television 1 according to Embodiment 1. FIG. 4(a) is a graph indicating an example of gain of each primary color of the luminance priority image, FIG. 4(b) is a graph indicating another example of gain of each primary color of the luminance priority image, and FIG. 4(c) is a graph indicating still another example of gain of each primary color of the luminance primary image.

Since there is a difference in white balance on images to be displayed by individual display units 16 included in televisions 1, a process of adjusting white balance is executed, for example, in a process of manufacturing the televisions 1. An example of such process of adjusting white balance will be described below.

First, as illustrated in FIG. 3(a), when a gradation value of an image signal that has been input is a highest gradation value, the television 1 displays an image with gain which is set so that luminance of the image to be displayed becomes highest luminance. Subsequently, in order that chromaticity of the image displayed by the television. 1 becomes a predetermined chromaticity, a gain value of any primary color among the primary colors is fixed and gain values of the other two primary colors are lowered. For example, in a case where white balance is adjusted by fixing gain of red (R), gains of the primary colors are those indicated in the graph illustrated in FIG. 3(b). In an image in which white balance is adjusted in such a manner, although luminance is low, chromaticity is adjusted and therefore the television 1 displays the image as a chromaticity priority image.

On the other hand, by increasing a gain value, which has been lowered by adjustment of white balance, the television 1 is able to display an image in which, while chromaticity is deviated from the predetermined chromaticity, luminance is high, that is, luminance priority image. The television 1 is able to display the luminance priority image by increasing gain values of green (G) and blue (B) as illustrated in FIG. 4(a).

Moreover, as illustrated in FIGS. 4(b) and 4(c), the television 1 may display, as the luminance priority image, an image in which a gain value of at least one primary color among the primary colors, which is gain at a gradation value higher than a predetermined gradation value (first predetermined gradation value), is changed so that luminance is enhanced.

For example, as illustrated in FIG. 4(b), a gain value of green (G) from a lowest gradation value to a gradation value L1 is set to be a gain value which is the same as that of a chromaticity priority image. In addition, the gain value of green (G) at a gradation value higher than the gradation value L1 is set so that luminance becomes maximum in a case of a highest gradation value.

Similarly, as to gain of blue (B), a gain value of blue (B) from the lowest gradation value to a gradation value L2 is set to be a gain value which is the same as that of the chromaticity priority image. In addition, the gain of blue (B) at a gradation value higher than the gradation value L2 is set so that luminance becomes maximum in the case of the highest gradation value.

By setting a gain value in such a manner, the television 1 is able to display as the chromaticity priority image, an image whose gradation value is lower than the gradation value L1 and the gradation value L2, and to display, as the luminance priority image, an image whose gradation value is higher than the gradation value L1 and the gradation value L2.

Moreover, as another example, as illustrated in FIG. 4(c), a gain value of green (G) from the lowest gradation value to a gradation value L3 is set to be a gain value which is the same as that of the chromaticity priority image. Moreover, the gain value of green (G) at a gradation value higher than the gradation value L3 is set to be a value which is higher than the gain value of the chromaticity priority image and with which luminance becomes lower than a maximum value in the case of the highest gradation value.

Similarly, as to gain of blue (B), a gain value of blue (B) from the lowest gradation value to a gradation value L4 is set to be a gain value which is the same as that of the chromaticity priority image. Moreover, the gain of blue (B) at a gradation value higher than the gradation value L4 is set to be a value which is higher than the gain value of the chromaticity priority image and with which luminance becomes lower than a maximum value in the case of the highest gradation value.

By setting a gain value in such a manner, the television 1 is able to display, as the chromaticity priority image, an image whose gradation value is lower than the gradation value L3 and the gradation value L4, and to display, as the luminance priority image in which deviation of chromaticity is suppressed, an image whose gradation value is higher than the gradation value L3 and the gradation value L4.

Note that, the gradation value L1 to the gradation value L4 (hereinafter, also referred to collectively as a "predetermined gradation value L") may be the same gradation value.

Moreover, the predetermined gradation value L may be any value, and, for example, there is a method of setting, as the predetermined gradation value L, a gradation value of high luminance within 10% from the top in a histogram of an image signal input to the television 1. In addition, there is a method of setting, as the predetermined gradation value L, a gradation value with which luminance that is indicated by information included in an HDR signal input to the television 1 becomes higher than a predetermined luminance (for example, luminance of 50% of luminance that the display unit 16 is able to display, or the like).

In a case where the television 1 includes a configuration (that is, local dimming) in which the display unit 16 is divided into a plurality of areas and luminance of an image to be displayed is able to be adjusted for each of the plurality of areas, there is a method of setting, as the predetermined gradation value L, a gradation value with which the highest luminance becomes higher than a predetermined luminance. More specifically, when it is assumed that luminance that the television 1 is able to perform display most brightly when lighting all of the areas with the same luminance is luminance of 100%, when lighting a part of the plurality of areas brightly, it is possible to concentrate power on the part compared with a case of lighting all of the areas with luminance of 100% and therefore it is possible to display luminance of 100% or higher in the part. Accordingly, there is a method of setting, as the predetermined gradation value L, a gradation value with which luminance becomes 100% when it is assumed that, for example, luminance of 100% in the display unit 16 is the aforementioned predetermined luminance.

(Processing Executed by Television 1)

Figure 5:
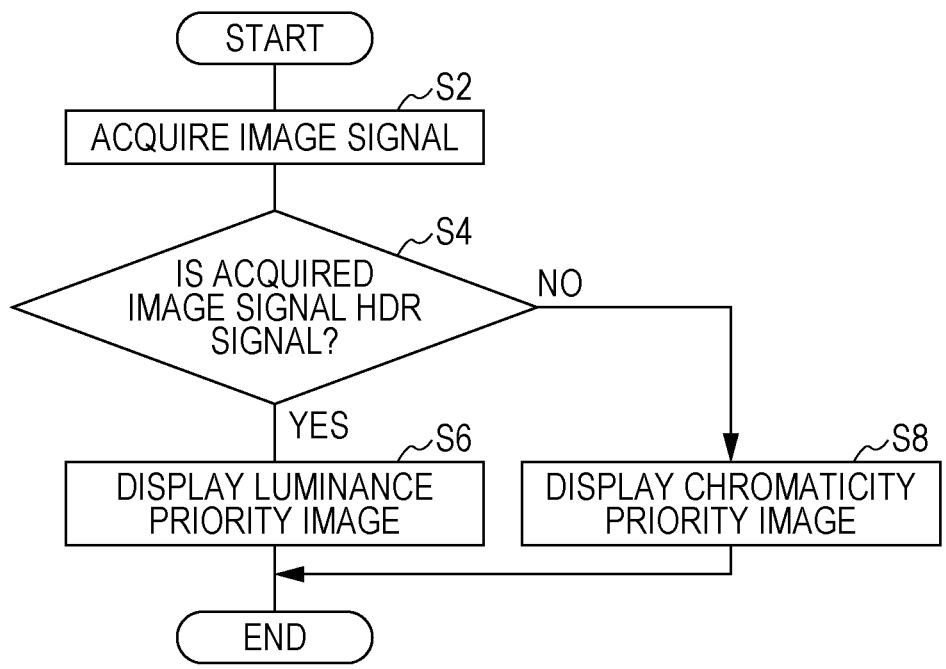
FIG. 5 is a flowchart illustrating a flow of processing executed by the television, according to Embodiment 1 of the invention.

FIG. 5 is a flowchart illustrating a flow of processing executed by the television. 1, according to Embodiment 1. The processing (display method of displaying an image on the television 1) executed by the television 1 will be described with reference to FIG. 5.

First, the processing in FIG. 5 is executed. In a state where adjustment of white balance of a luminance priority image and adjustment of white balance of a chromaticity priority image have been performed for the television 1 and a gain value of each of the primary colors after the adjustment is stored in the storage unit 18.

(Step S2)

The image signal acquisition unit 10 acquires an image signal. The image signal acquisition unit 10 outputs the acquired image signal to the determination unit 12.

(Step S4: Determining Step)

The determination unit 12 determines whether or not the image signal output from the image signal acquisition unit 10 is an HDR signal.

(Step S6: Display Controlling Step)

In a case where it is determined, at step S4, that "the image signal is an HDR signal" (step S4: YES), the display control unit 14 acquires the gain value of each of the primary colors after the adjustment of white balance of the luminance priority image from the storage unit 18 to thereby cause the display unit 16 to display the luminance priority image.

(Step S8)

On the other hand, in a case where it is determined, at step S4, that "the image signal is not an HDR signal" (step S4: NO), the display control unit 14 acquires the gain value of each of the primary colors after the adjustment of white balance of the chromaticity priority image from the storage unit 18 to thereby causes the display unit 16 to display the chromaticity priority image.

In this manner, the television 1 according to the present embodiment displays the luminance priority image in the case where the input image signal is an HDR signal. Thus, the television 1 is able to display an image in which deterioration in luminance due to adjustment of white balance is suppressed, in the case where the input image signal is an HDR signal.

Note that, the television 1 may be configured to display an image with each gain value of the graph indicated in. FIG. 4(b) or 4(c), which has been described above, without executing the above-described processing of step S4. In this case, regardless of the input image signal, the television 1 puts priority on chromaticity for an image whose gradation value is low, and puts priority on luminance for an image whose gradation value is high. Therefore, the television 1 is able to display an image having an enhanced contrast, while suppressing deviation of chromaticity in an image whose gradation value is high.

Moreover, the display control unit 14 may be configured to display a luminance priority image, in which gain of at least one primary color among the primary colors is changed to be a value higher than a set value, in a case where the determination unit 12 determines that the image signal is an HDR signal and a gradation value of an image indicated by the input image signal is higher than a predetermined gradation value (second predetermined gradation value). In this case, the television 1 displays the luminance priority image when displaying the image in which the gradation value is higher than the predetermined gradation value and therefore it is possible to display the image having an enhanced contrast. As an example of the predetermined gradation value, there is a method of setting, as the predetermined gradation value, a gradation value of high luminance within 10% from the top in a histogram of an image signal input to the television 1.

Further, the display control unit 14 may be configured to display a luminance priority image, in which gain of at least one primary color among the primary colors is changed to be a value higher than a set value, in a case where the determination unit 12 determines that the image signal is an HDR signal and luminance indicated by luminance information included in the input HDR signal is higher than a predetermined luminance (first predetermined luminance). In this case, the television 1 displays the luminance priority image when displaying the image in which the luminance is higher than the predetermined luminance and therefore it is possible to display the image having an enhanced contrast. Examples of the predetermined luminance include luminance of 50% of luminance that the display unit 16 is able to display.

Furthermore, when the television 1 includes the above-described configuration of local dimming, the display control unit 14 may be configured to display a luminance priority image in a case where the determination unit 12 determines that the image signal is an HDR signal and luminance of an area whose luminance is the highest among the plurality of areas is higher than a predetermined luminance (second predetermined luminance). In this case, the television 1 displays the luminance priority image when luminance which is able to be displayed is higher than the predetermined luminance and therefore it is possible to display the image having an enhanced contrast. Examples of the predetermined luminance include luminance of 100% of luminance that the display unit 16 is able to display.

Moreover, the television 1 may be configured to allow a user to set whether or not to display an image in which gain values different in accordance with whether an input signal is an HDR signal or an SDR signal are set. For example, the television 1 displays a menu screen through which an operation of switching ON/OFF is accepted. Then, in a case where the operation acceptance unit 20 accepts an operation of switching ON, the image in which the gain value differs in accordance with whether an input signal is an HDR signal or an SDR signal is displayed. On the other hand, it may be configured that, in a case where the operation acceptance unit 20 accepts an operation of image-switching OFF, an image is displayed in which the same gain value is set regardless of whether the input signal is an HDR signal or an SDR signal.

[Embodiment 2]

Another embodiment of the invention will be described below. Note that, for convenience of description, the same reference signs will be assigned to members having the same functions as the members described in the aforementioned embodiment, and description thereof will be omitted. In Embodiment 2, a configuration in which a user sets the predetermined gradation value L in Embodiment 1 will be described with reference to FIG. 6. Note that, although the configuration in which user sets the predetermined gradation value L is described in the present embodiment, it may be configured that a user is able to set the gradation value L1 to the gradation value L4 individually.

Figure 6:
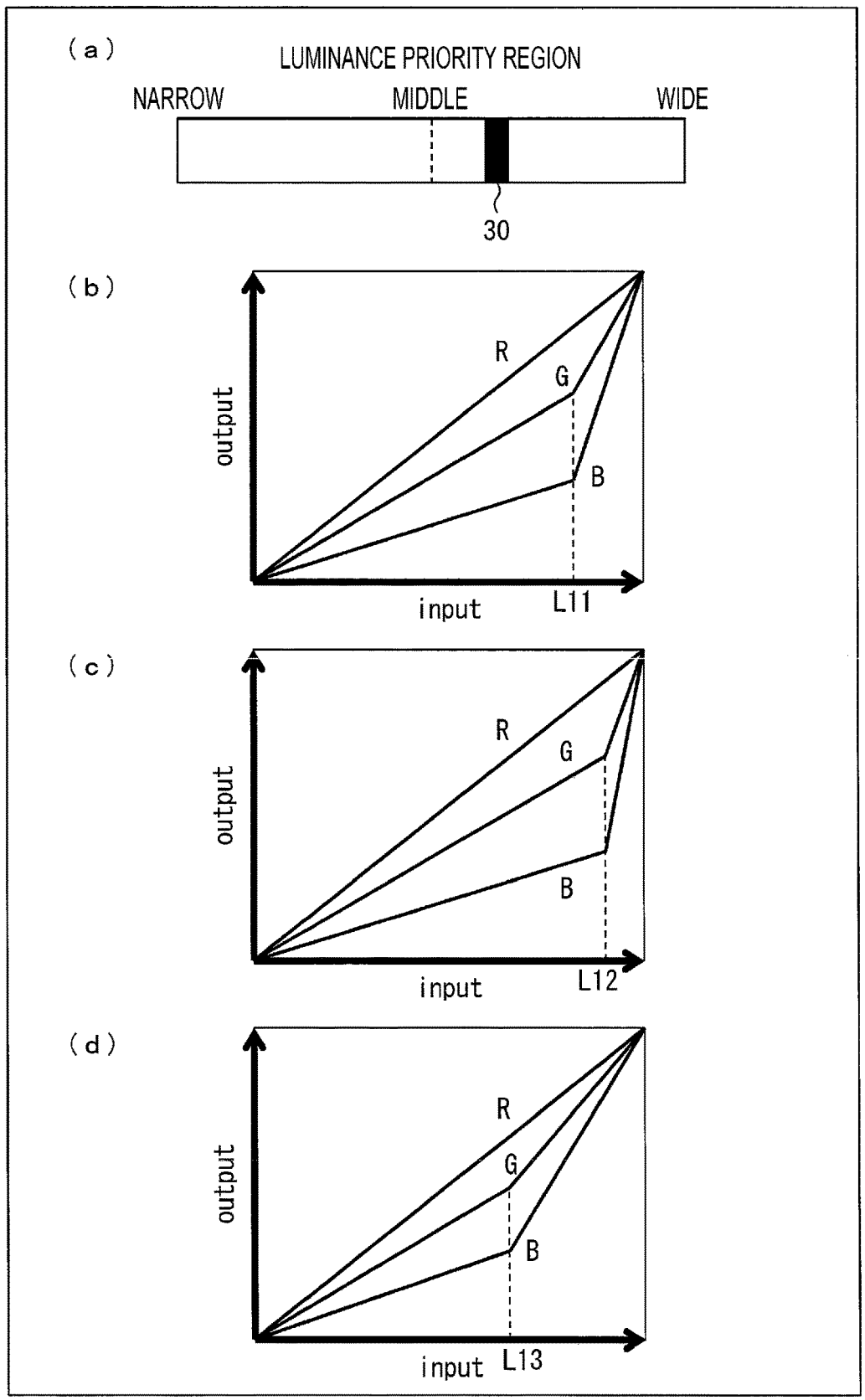
FIG. 6 is a view illustrating a configuration according to Embodiment 2 of the invention in which a user is able to set a predetermined gradation value.

FIG. 6 is a view illustrating the configuration of Embodiment 2, in which a user is able to set the predetermined gradation value FIG. 6(a) is a view illustrating an example of a menu screen through which a user sets the predetermined gradation value, 6(b) is a graph. indicating an example of gain of each of the primary colors when the user sets a predetermined gradation value L11, 6(c) is a graph indicating another example of gain of each of the primary colors when the user sets a predetermined gradation value L12, and (d) is a graph indicating still another example of gain of each of the primary colors when the user sets a predetermined gradation value L13.

For example, by diplaying the menu screen illustrated in FIG. 6(a), the television 1 is able to allow a user to set the predetermined gradation value. In the menu screen illustrated in FIG. 6(a), the operation acceptance unit 20 accepts an operation of moving a bar 30 to the right or the left by the user. Then, the display control unit 14 changes the predetermined gradation value in accordance with the operation accepted by the operation acceptance unit 20.

For example, in a case where the operation acceptance unit 20 accepts an operation of moving a position of the bar 30 to "narrow" on the left in a state where the predetermined gradation value is set to be the gradation value L11, which is indicated. In. FIG. 6(b), correspondingly to the position of the bar 30, which is illustrated in FIG. 6(a), the display control unit 14 sets the predetermined gradation value to be the gradation value L12 which is higher than the gradation value L11 as illustrated in FIG. 6(c). On the other hand, in a case where the operation acceptance unit 20 accepts an operation of moving the position of the bar 30 to "wide" on the right, the display control unit 14 sets the predetermined gradation value to be the gradation value L13 which is lower than the gradation value L11 as illustrated in FIG. 6(d).

In this manner, when accepting an operation of setting the predetermined gradation value, the television 1 according to the present. Embodiment 2 changes the predetermined gradation value L in accordance with the operation. Thus, the television 1 is able to display an image which corresponds to an input signal and which is desired by a user.

[Embodiment 3]

Still another embodiment of the invention will be described below. Note that, for convenience of description, the same reference signs will be assigned to members having the same functions as the members described in the aforementioned embodiments, and description thereof will be omitted. In Embodiment 3, a configuration in which a user sets a gain value at a gradation value higher than the predetermined gradation value L in Embodiment 1 will be described with reference to FIG. 7. Note that, although the configuration in which a user sets gain values of green (G) and blue (B) which are primary colors other than red (R) whose gain value is fixed is described in the present embodiment, the gain values of green (G) and blue (B) may be individually set by a user.

Figure 7:
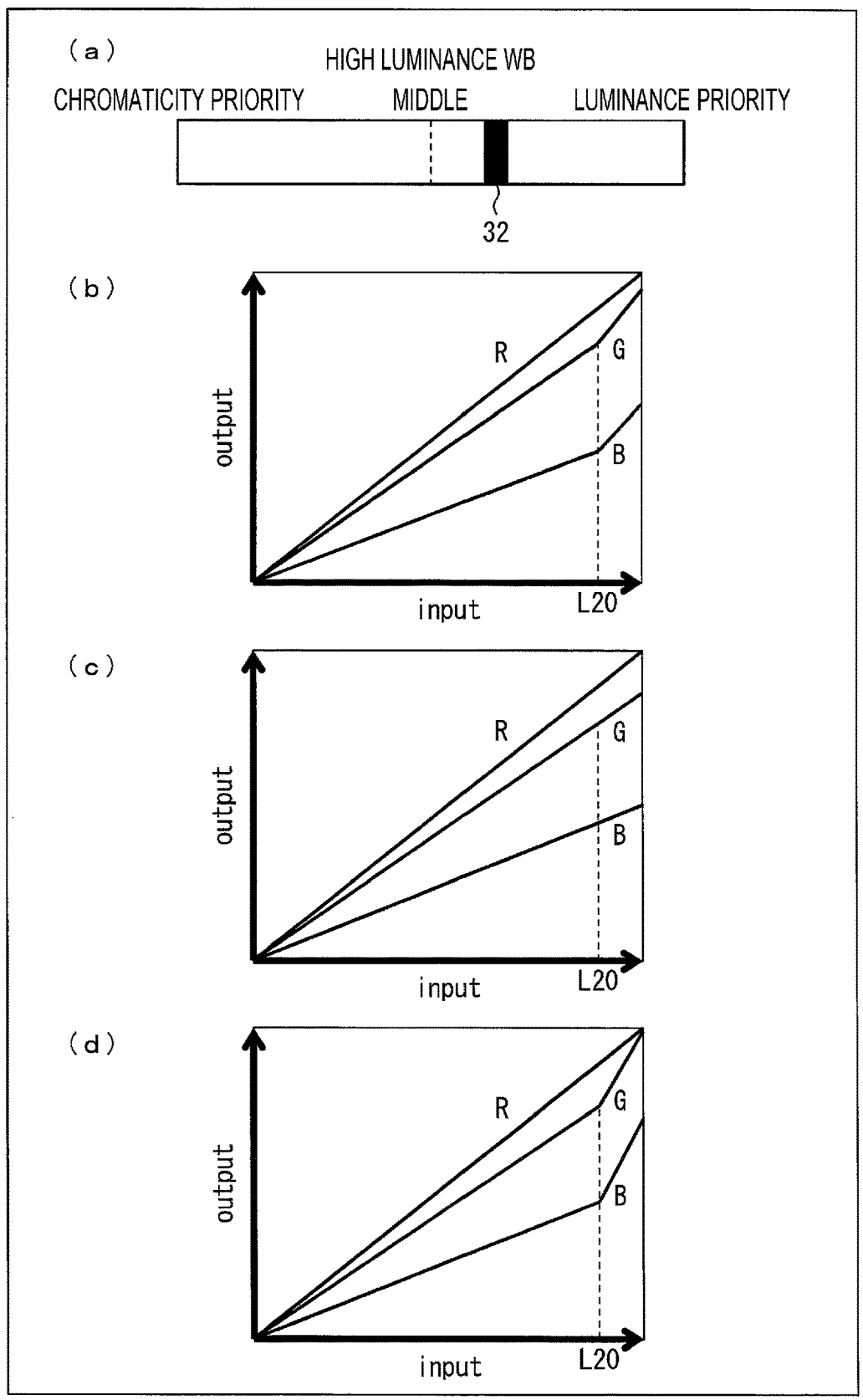
FIG. 7 is a view illustrating a configuration according to Embodiment 3 of the invention in which a user is able to set gain at a gradation value higher than a predetermined gradation value.

FIG. 7 is a view illustrating the configuration of Embodiment 3, in which a user is able to set a gain value alp a gradation value higher than a predetermined gradation value L20. FIG. 7(a) is a view illustrating an example of a menu screen through which a user adjusts a gain value at a gradation value higher than the predetermined gradation value L20, 7(b) is a graph indicating an example of gain of each of the primary colors when the user sets a gain value at a gradation value higher than the predetermined gradation value L20, 7(c) is a graph indicating another example of gain of each of the primary colors when the user sets a gain value at a gradation value higher than the predetermined gradation value L20, and 7(d) is a graph indicating still another example of gain of each of the primary colors when the user sets a gain value at a gradation value higher than the predetermined gradation value L20.

For example, by displaying the menu screen illustrated in FIG. 7(a), the television 1 is able to allow a user to set a gain value at a gradation value higher than the predetermined gradation value L. In the menu screen illustrated in FIG. 7(a), the operation acceptance unit 20 accepts an operation of moving a bar 32 to the right or the left by the user. Then, the display control unit 14 changes a gain value at a gradation value higher than the predetermined gradation value L in accordance with the operation accepted by the operation acceptance unit 20.

For example, in a case where the operation acceptance unit 20 accepts an operation of moving a position of the bar 32 to "chromaticity priority" on the left in a state where, correspondingly to the position of the bar 32, which is illustrated in FIG. 7(a), gain at a gradation value higher than the predetermined gradation value L20 is set as in the graph indicated in FIG. 7(b), the display control unit 14 sets a gain value at the gradation value higher than the predetermined gradation value L20 to be low as illustrated in FIG. 7(c). On the other hand, in a case where the operation acceptance unit 20 accepts an operation of moving the position of the bar 32 to "luminance priority" on the right, the display control unit 14 sets the gain value at the gradation value higher than the predetermined gradation value L20 to be high as illustrated in FIG. 7(d).

In this manner, when accepting an operation of setting a gain value at a gradation value higher than the predetermined gradation value L20, the television 1 according to the present Embodiment 3 changes the gain value at the gradation value higher than the predetermined gradation value L20 in accordance with the operation. Thus, the television 1 is able to display an image which corresponds to an input signal and which is desired by a user.

[Implementation Example by Software]

Each block (particularly, the determination unit 12 and the display control unit 14) of the television receiver 1 may be implemented by a logical circuit (hardware) formed on, for example, an integrated circuit (IC chip) or may be implemented by software by using a CPU (Central Processing Unit).

When each block is implemented by software by using a CPU, the television receiver 1 includes a CPU for executing a command of a program which is software for implementing each function, a ROM (Read Only Memory) or a storage device (each of which is referred to as a "recording medium") in which the program and various kinds of data are stored so as to be readable by a computer (or the CPU), a RAM (Random Access Memory) for expanding the program, and the like. Then, the object of the invention is achieved when the computer (or the CPU) reads the program from the recording medium for execution. As the recording medium, "non-transitory physical medium" such as, for example, a tape, a disk, a card, a semiconductor memory, or a programmable logical circuit is able to be used. Furthermore, the program may be supplied to the computer via any transmission medium (such as a communication network or a broadcast wave) capable of transmitting the program. Note that, the invention is also able to be implemented in a form of a data signal embedded in a carrier wave is which the program is embodied by electronic transmission.

[Conclusion]

A display device (television receiver 1) according to an aspect 1 of the invention is a display device that displays an image in which white balance is adjusted by setting a gain value of each of primary colors (R, G, B), including: a determination unit (12) that determines whether an image signal that has been input is a first image signal (SDR signal) or a second image signal (HDR signal) a possible luminance dynamic range of which is wider than that of the first image signal; and a display control unit (14) that, in a case where the determination unit determines that the image signal is the second image signal, changes gain of at least one primary color among the primary colors to a value higher than a set value.

With the aforementioned configuration, in the case where the input image signal is the HDR signal, the display device according to the present aspect changes gain of at least one primary color among the primary colors to a value higher than the value which has been set by adjustment of white balance. Accordingly, in the case where the input image signal is the HDR signal, the display device according to the present aspect is able to display an image is which deterioration in luminance due to adjustment of white balance is suppressed.

In the display device according to an aspect 2 of the invention, in the case where the determination unit in the aspect 1 determines that the image signal is the second image signal, the display control unit may change, to a value higher than the set value, a gain value that is a gain value of at least one primary color among the primary colors and that is at a gradation value higher than a first predetermined gradation value.

With the aforementioned configuration, the display device according to the present aspect displays, as an image of a gradation value which is equal to or less than the first predetermined gradation value, an image (chromaticity priority image) that is set by adjustment of white balance, and displays, as an image of a gradation value higher than the first predetermined gradation value, an image (luminance priority image) is which a value higher than a gain value set by adjustment of white balance is set. Accordingly, in the case where the input image signal is the HDR signal, the display device according to the present aspect is able to display an image having an enhanced contrast.

In the display device according to an aspect 3 of the invention, the display control unit in the aspect 2 may change the first predetermined gradation value in accordance with an operation by a user.

With the aforementioned configuration, the display device according to the present aspect is able to display an image desired by the user.

In the display device according to an aspect 4 of the invention, the display control unit in any of the aspects 1 to 3 may change a gain value of at least one primary color among the primary colors in accordance with an operation by a user.

With the aforementioned configuration, the display device according to the present aspect is able to display an image desired by the user.

In the display device according to an aspect 5 of the invention, the display control unit may change, to a value higher than the set value, gain of at least one primary color among the primary colors, in a case where the determination unit according to any of the aspects 1 to 4 determines that the image signal is the second image signal and a gradation value of an image, which is indicated by the input image signal, is higher than a second predetermined gradation value.

With the aforementioned configuration, in a case where a gradation value higher than the second predetermined gradation value is included in the input image signal, that is, in a case where an image to be displayed with a high luminance is included, the display device according to the present aspect displays a luminance priority image. Accordingly, in the case where the input image signal is the HDR signal, the display device according to the present aspect is able to display an image having an enhanced contrast.

In the display device according to an aspect 6 of the invention, the display control unit may change, to a value higher than the set value, gain of at least one primary color among the primary colors, in a case where the determination unit in any of the aspects 1 to 5 determines that the image signal is the second image signal and luminance indicated by luminance information included in the input second image signal is higher than a first predetermined luminance.

With the aforementioned configuration, in the case where the luminance indicated by the luminance information included in the input HDR signal is higher than the first predetermined luminance, that is, in a case where an image to be displayed with high luminance is included, the display device according to the present aspect displays a luminance priority image. Accordingly, in the case where the input image signal is the HDR signal, the display device according to the present aspect is able to display an image having an enhanced contrast.

In the display device according to an aspect 7 of the invention, the display control unit in any of the aspects 1 to 6 is able to adjust luminance of an image, which is to be displayed, for each of a plurality of divided areas, and the display control unit may change, to a value higher than the set value, gain of at least one primary color among the primary colors, in a case where luminance of an area luminance of which is highest among the plurality of divided areas is higher than a second predetermined luminance.

With the aforementioned configuration, the display device according to the present aspect is able to adjust luminance of an image, which is to be displayed, for each of the plurality of divided areas (in other words, a local dimming function is included), and displays a luminance priority image, in the case where luminance of an area luminance of which is highest is higher than the second predetermined luminance, that is, in a case where an image to be displayed with high luminance is included. Accordingly, in the case where the input image signal is the HDR signal, the display device according to the present aspect is able to display an image having an enhanced contrast.

A television receiver (1) according to an aspect 8 of the invention includes the display device according to any of the aspects 1 to 7.

With the aforementioned configuration, it is possible to realize a television receiver that exerts an effect equivalent to that of the display device according to any of the aspects 1 to 7.

A display method according to an aspect 9 of the invention is a display method of displaying an image on a display device that displays an image is which white balance is adjusted by setting a gain value of each of primary colors, including: a determination step of determining whether an image signal that has been input is a first image signal or a second image signal a possible luminance dynamic range of which is wider than that of the first image signal; and a display control step of changing, in a case where the image signal is determined to be the second image signal at the determination step, gain of at least one primary color among the primary colors to a value higher than a set value.

With the aforementioned configuration, the display method according to the present aspect exerts an effect equivalent to that of the display device according to the aspect 1.

The display device according to each aspect of the invention may be implemented by a computer. In this case, a control program of the display device, which implements the display device with the computer by causing the computer to operate as each unit (software element) provided in the display device, and a computer readable recording medium which stores the control program are also included in the scope of the invention.

The invention is not limited to each of the embodiments described above, and may be modified in various manners within the scope of the claims and an embodiment achieved by appropriately combining technical means disclosed in each of different embodiments is also encompassed in the technical scope of the invention. Further, by combining the technical means disclosed in each of the embodiments, a new technical feature may be formed.

REFERENCE SIGNS LIST 1 television receiver (display device)
10 image signal acquisition unit
12 determination unit
14 display control unit
16 display unit
18 storage unit
20 operation acceptance unit

The invention claimed is:

1. A display device that displays an image in which white balance is adjusted by setting a gain value of each of primary colors, the display device comprising:
   a determination unit that determines whether an image signal that has been input is a first image signal or a second image signal a possible luminance dynamic range of which is wider than that of the first image signal; and
   a display control unit that, in a case where the determination unit determines that the image signal is the second image signal, changes gain of at least one primary color among the primary colors to a value higher than a set value,
   wherein the display control unit changes, to a value higher than the set value, a gain value that is a gain value of at least one primary color among the primary colors and that is at a gradation value higher than a first predetermined gradation value, in the case where the determination unit determines that the image signal is the second image signal.

2. The display device according to claim 1, wherein the display control unit changes the first predetermined gradation value in accordance with an operation by a user.

3. The display device according to claim 1, wherein the display control unit changes a gain value of at least one primary color among the primary colors in accordance with an operation by a user.

4. The display device according to claim 1, wherein the display control unit changes, to a value higher than the set value, gain of at least one primary color among the primary colors, in a case where the determination unit determines that the image signal is the second image signal and a gradation value of an image, which is indicated by the input image signal, is higher than a second predetermined gradation value.

5. The display device according to claim 1, wherein
the display control unit changes, to a value higher than the set value, gain of at least one primary color among the primary colors, in a case where the determination unit determines that the image signal is the second image signal and luminance indicated by luminance information included in the input second image signal is higher than a predetermined luminance.

6. The display device according to claim 1, wherein
the display control unit is able to adjust luminance of an image, which is to be displayed, for each of a plurality of divided areas, and
the display control unit changes, to a value higher than the set value, gain of at least one primary color among the primary colors, in a case where luminance of an area luminance of which is highest among the plurality of divided areas is higher than a predetermined luminance.

7. A television receiver comprising
the display device according to claim 1.

8. A display method of displaying an image on a display device that displays an image in which white balance is adjusted by setting a gain value of each of primary colors, the display method comprising:

a determination step of determining whether an image signal that has been input is a first image signal or a second image signal that indicates an image a dynamic range of which is wider than a dynamic range of an image indicated by the first image signal; and a display control step of changing, in a case where the image signal is determined to be the second image signal at the determination step, gain of at least one primary color among the primary colors to a value higher than a set value, wherein the display control step changes, to a value higher than the set value, a gain value that is a gain value of at least one primary color among the primary colors and that is at a gradation value higher than a first predetermined gradation value, in the case where the determination step determines that the image signal is the second image signal.

9. A computer readable non-transitory recording medium that stores a control program that causes a computer to function as the display device according to claim 1 and that causes the computer to function as the determination unit and the display control unit.

* * * * *